(12) United States Patent
Marutani et al.

(10) Patent No.: US 8,827,694 B2
(45) Date of Patent: Sep. 9, 2014

(54) BURNER DEVICE

(75) Inventors: Youichi Marutani, Odawara (JP); Yasunori Ashikaga, Yokohama (JP); Syouji Itoh, Tokyo (JP); Akihiko Ogasawara, Azumino (JP)

(73) Assignee: IHI Corporation (JP)

( * ) Notice: Subject to any disclaimer, the term of this patent is extended or adjusted under 35 U.S.C. 154(b) by 0 days.

(21) Appl. No.: 13/635,937

(22) PCT Filed: Mar. 23, 2011

(86) PCT No.: PCT/JP2011/056985
§ 371 (c)(1),
(2), (4) Date: Sep. 19, 2012

(87) PCT Pub. No.: WO2011/118635
PCT Pub. Date: Sep. 29, 2011

(65) Prior Publication Data
US 2013/0011801 A1 Jan. 10, 2013

(30) Foreign Application Priority Data
Mar. 24, 2010 (JP) ................. 2010-068092

(51) Int. Cl.
*F23D 14/02* (2006.01)
*F23D 14/62* (2006.01)
*F01N 3/10* (2006.01)
*F01N 3/00* (2006.01)
*F23C 6/04* (2006.01)
*F23D 99/00* (2010.01)
*F01N 3/025* (2006.01)

(52) U.S. Cl.
CPC ..... *F23D 21/005* (2013.01); *F23C 2900/06041* (2013.01); *F01N 3/025* (2013.01); *F23C 6/04* (2013.01); *F01N 2470/00* (2013.01)

USPC ............... 431/354; 431/159; 60/303; 60/286; 60/324

(58) Field of Classification Search
CPC .............. F23M 9/04; F32M 9/02; F23C 6/04; F23D 11/008; F23D 99/003; F01N 3/256
USPC .......................................... 431/354
See application file for complete search history.

(56) References Cited

U.S. PATENT DOCUMENTS 1,650,342 A * 11/1927 Good ............................. 431/266
3,366,373 A * 1/1968 Reed ............................. 432/222

(Continued)

FOREIGN PATENT DOCUMENTS

CN 101336353 A 12/2008
CN 102472490 A 5/2012

(Continued)

OTHER PUBLICATIONS

International Search Report and Written Opinion mailed Apr. 19, 2011 in corresponding PCT International Application No. PCT/JP2011/056985.

(Continued)

*Primary Examiner* — Kang Hu
*Assistant Examiner* — Deepak Deean
(74) *Attorney, Agent, or Firm* — Ostrolenk Faber LLP

(57) ABSTRACT

Disclosed is a burner device that includes a partition member which air-permeably partitions an ignition region for igniting a mixture gas and a flame retaining region for maintaining the combustion of the mixture gas, and also adjusts the flow speed of the mixture gas supplied from the ignition region to the flame retaining region, the partition member including a protrusion portion that protrudes into an oxidant flow passage and stops a part of the oxidant flowing through the oxidant flow passage to guide the oxidant into a take-in passage region.

8 Claims, 7 Drawing Sheets

(56) References Cited

U.S. PATENT DOCUMENTS

| | | | | |
|---|---|---|---|---|
| 3,423,928 A | * | 1/1969 | Walsh | 422/182 |
| 3,593,969 A | * | 7/1971 | Smithson et al. | 432/222 |
| 3,829,281 A | * | 8/1974 | Briggs et al. | 432/63 |
| 4,318,887 A | * | 3/1982 | Leistritz | 422/173 |
| 4,383,411 A | | 5/1983 | Riddel | 60/303 |
| 4,505,106 A | * | 3/1985 | Frankenberg et al. | 60/286 |
| 4,576,617 A | * | 3/1986 | Renevot | 95/279 |
| 4,662,172 A | * | 5/1987 | Shinzawa et al. | 60/303 |
| 4,991,396 A | * | 2/1991 | Goerlich et al. | 60/303 |
| 5,056,501 A | | 10/1991 | Ida | 126/110 |
| 5,771,683 A | * | 6/1998 | Webb | 60/274 |
| 5,826,428 A | * | 10/1998 | Blaschke | 60/303 |
| 5,829,248 A | | 11/1998 | Clifton | 60/286 |

FOREIGN PATENT DOCUMENTS

| | | |
|---|---|---|
| JP | 48-104907 | 12/1973 |
| JP | 61-128323 | 8/1986 |
| JP | 01-14726 | 3/1989 |
| JP | 02-104911 | 4/1990 |
| JP | 06-167212 | 6/1994 |
| JP | 8-093555 | 4/1996 |
| JP | 08-135911 | 5/1996 |
| JP | 8-260944 | 10/1996 |
| JP | 2000-087731 | 3/2000 |
| JP | 2000-110548 | 4/2000 |
| JP | 2004-245091 | 9/2004 |
| JP | 2005-265344 | 9/2005 |
| JP | 2006-112423 | 4/2006 |
| JP | 2006-161768 | 6/2006 |
| JP | 2006-226808 | 8/2006 |
| JP | 2007-146700 | 6/2007 |
| JP | 2007-154772 | 6/2007 |
| JP | 2009-512810 | 3/2009 |
| JP | 2009-156073 | 7/2009 |
| JP | 2010-031779 | 2/2010 |
| JP | 2010-043564 | 2/2010 |
| KR | 95-14592 | 6/1995 |
| WO | WO 2008-016225 A1 | 2/2008 |

OTHER PUBLICATIONS

Korean Notice of Allowance of Patent dated Sep. 26, 2013 issued in Korean Application No. 10-2012-7027325 (with English translation).

Japanese Notice of Reasons for Rejection dated Oct. 15, 2013 issued in Japanese Application No. 2010-005015 (with English translation).

Japanese Office Action dated Nov. 5, 2013 issued in Japanese Application No. 2012-507034 (with English translation).

Chinese Office Action, dated Apr. 3, 2014, issued in corresponding Chinese Patent Application No. 201180015169.9. English translation. Total 11 pages.

Japanese Notice of Allowance, dated May 27, 2014, issued in corresponding Japanese Patent Application No. 2010-005015. English translation. Total 6 pages.

* cited by examiner

BURNER DEVICE

CROSS-REFERENCE TO RELATED APPLICATIONS

The present application is a 35 U.S.C. §§371 national phase conversion of PCT/JP2011/056985, filed Mar. 23, 2011, which claims priority of Japanese Patent Application No. 2010-068092, filed Mar. 24, 2010, the contents of which are incorporated herein by reference. The PCT International Application was published in the Japanese language.

TECHNICAL FIELD

The present invention relates to a burner device that combusts a mixture gas of an oxidant and a fuel.

BACKGROUND ART

In the exhaust gas from a diesel engine or the like, fine particles (particulate matter) are included. There is apprehension that release of these particles into the atmosphere may affect the environment. Therefore, in recent years, motor vehicles in which a diesel engine or the like is mounted are provided with a filter for removing fine particles in the exhaust gas (DPF: diesel particulate filter).

The filter is formed of ceramic or the like that is a porous body with a plurality of holes smaller than the fine particles. The filter prevents the fine particles from passing therethrough, to thereby collect the fine particles.

However, use of such a filter for a long time causes the collected fine particles to be accumulated, resulting in the clogging of the filter.

To prevent the clogging of the filter, a method such as shown in Patent Document 1 is employed in which a high-temperature gas is supplied to the filter, to thereby combust and remove the fine particles collected in the filter.

To be more specific, in Patent Document 1, a burner device is installed between a diesel engine and a filter. A mixture gas of an exhaust gas and a fuel is combusted to produce a high-temperature gas. The high-temperature gas is then supplied to the filter, to thereby combust fine particles.

CITATION LIST

Patent Document 1: Japanese Unexamined Patent Application, First Publication No. 2007-154772

In the aforementioned burner device, a fuel injected from a fuel injection device is mixed with an exhaust gas or outside air supplied as an oxidant to produce a mixture gas. The mixture gas is heated by an ignition device to not less than an ignition temperature. As a result, the mixture gas is burnt. The flame produced by the combustion is maintained, thereby leading to continuous combustion.

However, if the amount of the oxidant supplied to the combustion region is not sufficient, there may be a possible decrease in ignitability or possible instability of combustion state.

DISCLOSURE OF INVENTION

The present invention has been achieved in view of the above problem, and has an object to provide a burner device that supplies a sufficient amount of oxidant to a combustion region, to thereby stabilize a combustion state of a mixture gas and, moreover, to stably produce a high-temperature gas.

To solve the above problem, the present invention adopts the following.

The first invention of the present invention is a burner device that combusts a mixture gas of an oxidant and a fuel, the device including: an oxidant flow passage through which the oxidant flows; a pipe portion that has a hollow interior portion connected to the oxidant flow passage; and a partition member that air-permeably partitions the interior portion of the pipe portion into a take-in passage region of the oxidant, an ignition region that ignites the mixture gas, and a flame retaining region that maintains combustion of the mixture gas, in which the partition member includes a protrusion portion that protrudes into the oxidant flow passage, and that stops a part of the oxidant flowing through the oxidant flow passage to guide into the take-in passage region.

In the second invention of the present invention according to the first invention as set forth above, the flame retaining region is arranged on a downstream side of the protrusion portion.

In the third invention of the present invention according to the first or second invention as set forth above, an area of the protrusion portion that is exposed in the oxidant flow passage is 0.14 to 0.29S where S is a cross-sectional area of the oxidant flow passage.

ADVANTAGEOUS EFFECTS OF THE INVENTION

According to the present invention, the ignition region and the flame retaining region are air-permeably partitioned by the partition member. This makes it possible to adjust the flow speed of the mixture gas supplied form the ignition region to the flame retaining region. As a result, it is possible to adjust the flow speed of the mixture gas supplied to the flame retaining region to a flow speed at which the combustion is stabilized in the flame retaining region.

To improve the ignitability in the ignition region and also to improve the stability of combustion in the flame retaining region, it is required to take a sufficient amount of oxidant into the oxidant take-in passage. According to the present invention, a part of the oxidant flowing through the flow passage of the oxidant is stopped by the protrusion portion of the partition member to be guided to the take-in passage of the oxidant. As a result, according to the present invention, it is possible to improve the ignitability in the ignition region and also to improve the stability of combustion in the flame retaining region.

Thus, according to the present invention, the ignitability of the mixture gas is improved, and the combustion state of the mixture gas is stabilized. Therefore, it is possible to stably produce a high-temperature gas.

BEST MODE FOR CARRYING OUT THE INVENTION

Figure 1:
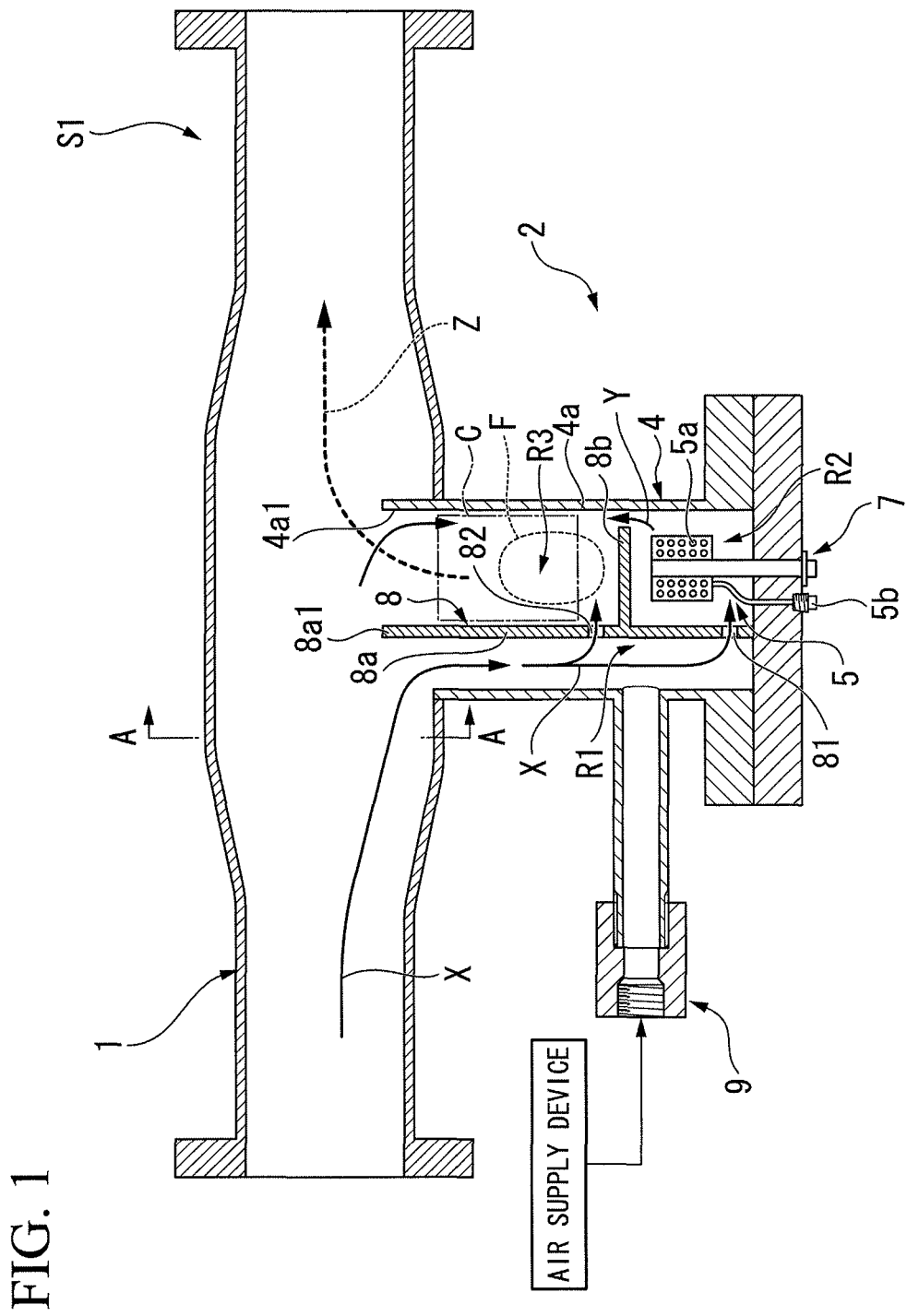
FIG. 1 is a cross-sectional view showing a schematic structure of a burner device according to a first embodiment of the present invention.

Hereinafter is a description of an embodiment of a burner device according to the present invention with reference to the drawings. In the drawings described below, the scale of each component has been suitably altered in order to make each component a recognizable size.

First Embodiment

FIG. 1 is a cross-sectional view showing a schematic structure of a burner device S1 according to the present embodiment.

The burner device S1 is connected to an exhaust port of a device for discharging an exhaust gas, such as a diesel engine, arranged on an upstream side. The burner device S1 mixes a supplied exhaust gas X (an oxidant) with a fuel and burns the mixture gas to produce a high-temperature gas Z. At the same time, the burner device S1 supplies the high-temperature gas Z to a filter on a downstream side. The burner device S is arranged, for example, between the diesel engine and a particulate filter.

The burner device S1 includes: a supply passage 1 (an oxidant flow passage); and a combustion portion (a combustion region) 2.

The supply passage 1 is a passage for supplying the exhaust gas X, which is supplied from a device such as a diesel engine, directly to the filter. The supply passage 1 is made of a cylindrical pipe whose first end portion is connected to the exhaust port of a device such as a diesel engine and whose second end portion is connected to the filter. Through the supply passage 1, the exhaust gas X flows which functions as an oxidant in the burner device S1.

The combustion portion 2 is connected to the supply passage 1. Inside the combustion portion 2, a part of the exhaust gas X flowing through the supply passage 1 and the fuel are mixed and burnt, to thereby produce a high-temperature gas. The combustion portion 2 includes: a pipe portion 4; a fuel supply portion 5; an ignition device 7; a partition member 8; and a supporting air supply device 9.

The pipe portion 4 is a tubular member that forms an outline shape of the combustion portion 2. An interior portion of the pipe portion 4 is hollow. As will be described in detail later, the interior portion of the pipe portion 4 is partitioned into an exhaust gas passage region R1, an ignition region R2, and a flame retaining region R3 by the partition member 8. The pipe portion 4 is connected to the supply passage 1 in a direction orthogonal to the direction in which the supply passage 1 extends.

The pipe portion 4 has a horizontal cross-sectional shape of square. As shown in FIG. 1, of the rectangular wall portion that constitutes the pipe portion 4, an end portion 4a1 (a wall end portion) of a wall portion 4a positioned on the downstream side in the flow direction of the exhaust gas X in the supply passage 1 is arranged in the supply passage 1.

Namely, in the burner device S1 of the present embodiment, the end portion 4a1 of the rectangular wall portion 4a is arranged in the circular supply passage 1.

The end portion 4a1 of the wall portion 4a takes in a part of the exhaust gas X (the oxidant) flowing through the supply passage 1, and supplies it directly to the flame retaining region R3.

The fuel supply portion 5 includes: a fuel retaining portion 5a provided at a front end of the ignition device 7; and a supply portion 5b for supplying a fuel to the fuel retaining portion 5a.

The fuel retaining portion 5a may be formed of, for example, a wire mesh, a sintered metal, metal fibers, a glass fabric, a ceramic porous body, ceramic fibers, pumice, or the like.

The ignition device 7 has its front-end portion surrounded by the fuel retaining portion 5a. As the ignition device 7, a glow plug is used, which is a heater that is heated to not less than an ignition temperature of the mixture gas of the fuel and the exhaust gas X.

The partition member 8 partitions the interior portion of the pipe portion 4 into: the exhaust gas passage region R1 through which the exhaust gas X taken in from the supply passage 1 flows; the ignition region R2 in which the ignition device 7 is installed; and the flame retaining region R3 in which the combustion of the mixture gas Y is maintained. The partition member 8 includes: a center plate 8a that extends vertically in the central portion of the pipe portion 4 and is spaced from a bottom surface of the pipe portion 4; and a side plate 8b that extends, as shown in FIG. 1, horizontally from the center plate 8a and is spaced from a side surface of the pipe portion 4. The area of the side plate 8b is set to be larger than that of the fuel retaining portion 5a when seen from above. The center plate 8a and the side plate 8b may be formed integrally or may be formed of separate members.

As shown in FIG. 1, in the partition member 8, the exhaust gas X can be ventilated from the exhaust gas passage region R1 to the ignition region R2 through a through-hole 81 formed on the bottom surface side of the center plate 8a. The mixture gas Y is can be ventilated from the ignition region R2 to the flame retaining region R3 through a gap between the side plate 8b and the side surface of the pipe portion 4. At the central portion of the center plate 8a, there is formed a through-hole 82. Through the through-hole 82, a part of the exhaust gas taken into the exhaust gas passage region R1 is supplied directly to the flame retaining region R3.

With the mixture gas Y passing from the ignition region R2 to the flame retaining region R3 through the gap formed between the partition member 8 and the pipe portion 4, the flow speed of the mixture gas Y is adjusted to that at which the combustion is stabilized in the flame retaining region R3.

Furthermore, with the mixture gas Y passing from bottom to top through the gap formed between the partition member 8 and the pipe portion 4 at a position close to the pipe portion 4, the mixture gas Y is caused to collide with a flow of the exhaust gas X (an oxidant flow) that is supplied from the top (the outside) of the flame retaining region R3 to the flame retaining region R3 along the wall surface of the pipe portion 4.

Ignitability in the ignition region R2 is influenced partly by a ratio between a gas flow area from the exhaust gas passage region R1 to the ignition region R2 and a gas flow area from the ignition region R2 to the flame retaining region R3. The ratio is appropriately set in accordance with the shape, performance, and the like of the burner device S1. For example, in the case of the present embodiment, it is preferable that the gas flow area from the exhaust gas passage region R1 to the ignition region R2 be larger than that from the ignition region R2 to the flame retaining region R3. This puts the ignition region R2 in a state always filled with a gas. As a result, the flow speed in the ignition region R2 is decreased, thus improving the ignitability in the ignition region R2. However, there are cases where making the gas flow area from the exhaust gas passage region R1 to the ignition region R2 smaller than that from the ignition region R2 to the flame retaining region R3 improves the ignitability in the ignition region R2.

Figure 2:
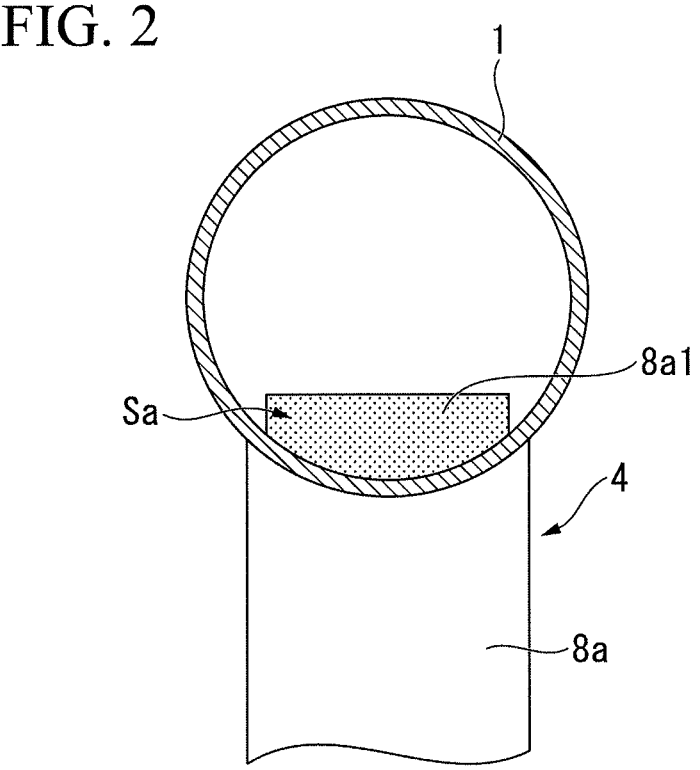
FIG. 2 is a cross-sectional view of the burner device according to the first embodiment of the present invention, taken along the A-A line.

In the burner device S1 of the present embodiment, the end portion 8a1 of the center plate 8a protrudes into the supply passage 1 as shown in FIG. 2, which is a front view of the center plate 8a. Namely, in the burner device S1 of the present embodiment, the partition member 8 includes the end portion 8a1 as a protrusion portion that protrudes from the interior portion of the pipe portion 4 into the supply passage 1.

The end portion 8a1 of the center plate 8a stops a part of the exhaust gas X flowing through the supply passage 1 and guides it to the exhaust gas passage region R1.

As shown in FIG. 1, in the burner device S1 of the present embodiment, the flame retaining region R3 is formed on the downstream side of the end portion 8a1 of the center plate 8a. As a result, with the flow of the exhaust gas X in the supply passage 1 being stopped by the end portion 8a1, a part of the exhaust gas X is supplied from the supply passage 1 to the flame retaining region R3.

As required, the supporting air supply device 9 supplementarily supplies air to the interior portion of the pipe portion 4 (the exhaust gas passage region R1). The supporting air supply device 9 includes: an air supply device that supplies air; a pipe that connects the air supply device to the interior portion of the pipe portion 4; and the like.

In the burner device S1 of the present embodiment, the exhaust gas X taken in from the supply passage 1 to the exhaust gas passage region R1 is supplied as an oxidant from the exhaust gas passage region R1 to the ignition region R2 via the through-hole 81.

On the other hand, the ignition device 7 is heated under control by a control apparatus (not shown in the figure). Thereby, the fuel supplied from the supply portion 5b to the fuel retaining portion 5a is volatilized in the ignition region R2.

Then, the exhaust gas X supplied to the ignition region R2 is mixed with the volatilized fuel to produce a mixture gas Y Furthermore, when heated to not less than an ignition temperature by the ignition device 7, the mixture gas Y is ignited.

The gas flow area from the exhaust gas passage region R1 to the ignition region R2 is set to be larger than that from the ignition region R2 to the flame retaining region R3. This puts the ignition region R2 in a state always filled with a gas. As a result, the flow speed of the fluid in the ignition region R2 is decreased. Therefore, it is possible to ignite the mixture gas Y with ease in the ignition region R2.

When the mixture gas Y is ignited in the ignition region R2 in this manner, a flame produced by the ignition is propagated together with the unburnt mixture gas Y to the flame retaining region R3. As a result, a flame F is formed in the flame retaining region R3. To the flame F, the unburnt mixture gas Y, the exhaust gas X supplied from above the flame retaining region R3, and the exhaust gas X supplied via the through-hole 82 are supplied. Thereby, the flame F is maintained. With the flame F being maintained, the high-temperature gas Z is stably produced.

After the mixture gas Y is ignited, a flame is formed also in the ignition region R2. Therefore, the mixture gas Y is subjected to primary combustion in the ignition region R2, and then, to secondary combustion in the flame retaining region R3.

Here, in the burner device S1 of the present embodiment, the ignition region R2 and the flame retaining region R3 are partitioned by the partition member 8 so that the mixture gas Y can permeate therethrough. Furthermore, the flow speed of the mixture gas Y supplied from the ignition region R2 to the flame retaining region R3 is adjusted to that at which the combustion is stabilized in the flame retaining region R3.

Therefore, according to the burner device 51 of the present embodiment, it is possible to stabilize the combustion state of the mixture gas Y and, moreover, to stably produce the high-temperature gas Z.

Furthermore, to improve the ignitability in the ignition region R2 and also to improve the stability of combustion in the flame retaining region R3, it is necessary to take a sufficient amount of exhaust gas X into the exhaust gas passage region R1. According to the burner device S1 of the present embodiment, a part of the exhaust gas X flowing through the supply passage 1 is stopped to be guided to the exhaust gas passage region R1 by the end portion 8a1 of the center plate 8a of the partition member 8. Therefore, according to the burner device S1 of the present embodiment, it is possible to improve the ignitability in the ignition region R2 and also to improve the stability of combustion in the flame retaining region R3.

Thus, the burner device S1 of the present embodiment improves the ignitability of the mixture gas Y and also stabilizes the combustion state of the mixture gas Y. Therefore, it is possible to stably produce the high-temperature gas Z.

Furthermore, in the burner device S1 of the present embodiment, the flame retaining region R3 is formed on the downstream side of the end portion 8a1 of the center plate 8a. With the flow of the exhaust gas X through the supply passage 1 being stopped by the end portion 8a1 as described above, a part of the exhaust gas X is supplied from the supply passage 1 to the flame retaining region R3. Namely, with the presence of the end portion 8a1, a part of the exhaust gas X in the supply passage 1 is eddied and supplied directly to the flame retaining region R3. As a result, a sufficient amount of oxidant is supplied to the flame retaining region R3. Thereby, it is possible to further stabilize the combustion state in the flame retaining region R3.

Typically, on the downstream side of the burner device S1, there is arranged a catalytic burner that burns an unburnt fuel included in the high-temperature gas Z. Therefore, it is preferable that the high-temperature gas Z have a temperature at which the catalyst is activated. In addition, the temperature of the high-temperature gas Z varies depending on the flow volume of the exhaust gas X that is taken into the burner device S1.

Namely, an area Sa of the end portion 8a1 of the center plate 8a that is exposed in the supply passage 1 (see FIG. 2) is preferably set so that the high-temperature gas Z has a temperature at which the catalyst is activated.

In experiments in which the ratio of the area Sa of the end portion 8a1 of the center plate 8a that was exposed in the supply passage 1 to the cross-sectional area S of the supply passage 1 was set to 0.04S, the temperature at the outlet of the catalytic burner was often below 230° C. at which the catalyst is activated. To be more specific, when a plurality of experiments were conducted with the supply amount of the fuel and the height of the flame retaining region R3 being varied, the temperatures at the outlet of the catalytic burner were 226° C., 211° C., 228° C., 216° C., 247° C., 200° C., 224° C., 250° C., 270.8° C., and 258° C.

On the other hand, in experiments in which the area Sa of the end portion 8a1 of the center plate 8a that was exposed in the supply passage 1 was set to 0.14S, the temperatures at the outlet of the catalytic burner were 259° C., 290° C., 305° C., 324° C., 246° C., 341° C., and 238° C.

In addition, in experiments in which the area Sa of the end portion 8a1 of the center plate 8a that was exposed in the supply passage 1 was set to 0.29S, the temperatures at the outlet of the catalytic burner were 239° C., 292° C., 311° C., 325° C., 336° C., 352° C., 364° C., 377° C., 390° C., 404° C., 416° C., 432° C., 445° C., 464° C., 477° C., and 490° C.

In the above experiments, the engine that supplies the exhaust gas X to the burner device S1 had a number of revolutions of 1800 rpm and a torque of 0 Nm.

According to the later knowledge of the inventors, it has been found out that if the area Sa of the end portion 8a1 is not more than 0.45S where S is a cross-sectional area of the supply passage 1, the temperature at the outlet of the catalytic burner is not less than 230° C.

Therefore, the area Sa of the end portion 8a1 of the present invention is preferably 0.14S to 0.45S, and more preferably 0.14S to 0.29S where S is the cross-sectional area of the supply passage 1.

If the area Sa of the end portion 8a1 is too large with respect to the cross-sectional area of the supply passage 1, the amount of the exhaust gas X taken into the pipe portion 4 is increased too much. As a result, the flow speed of the mixture gas in the pipe portion 4 becomes high, leading to a possible ignition failure and combustion failure. In addition, if the area Sa of the end portion 8a1 is too large with respect to the cross-sectional area of the supply passage 1, the passage area of the supply passage 1 is decreased. As a result, the pressure loss in the burner device S1 is increased, leading to a possibility that the exhaust gas X may not be favorably exhausted.

On the other hand, with the ratio between the area Sa of the end portion 8a1 of the center plate 8a and the cross-sectional area of the supply passage 1 is maintained as described above irrespective of the size of the burner device S1, it is possible to take an optimal amount of exhaust gas X for maintaining the flame F into the flame retaining region R3.

When the ratio between the area Sa of the end portion 8a1 of the center plate 8a and the cross-sectional area of the supply passage 1 is maintained as described above, it is possible to maintain the flame F in the flame retaining region R3 even if the internal space of the pipe portion 4 is made larger. Therefore, it is possible to make the internal space of the pipe portion 4 larger to make the ignition region R2 larger than that of the burner device S1 of the present embodiment. In this case, the flow speed of the mixture gas Y in the ignition region R2 is decreased. Therefore, it is possible to improve the ignitability of the mixture gas Y.

Figure 3:
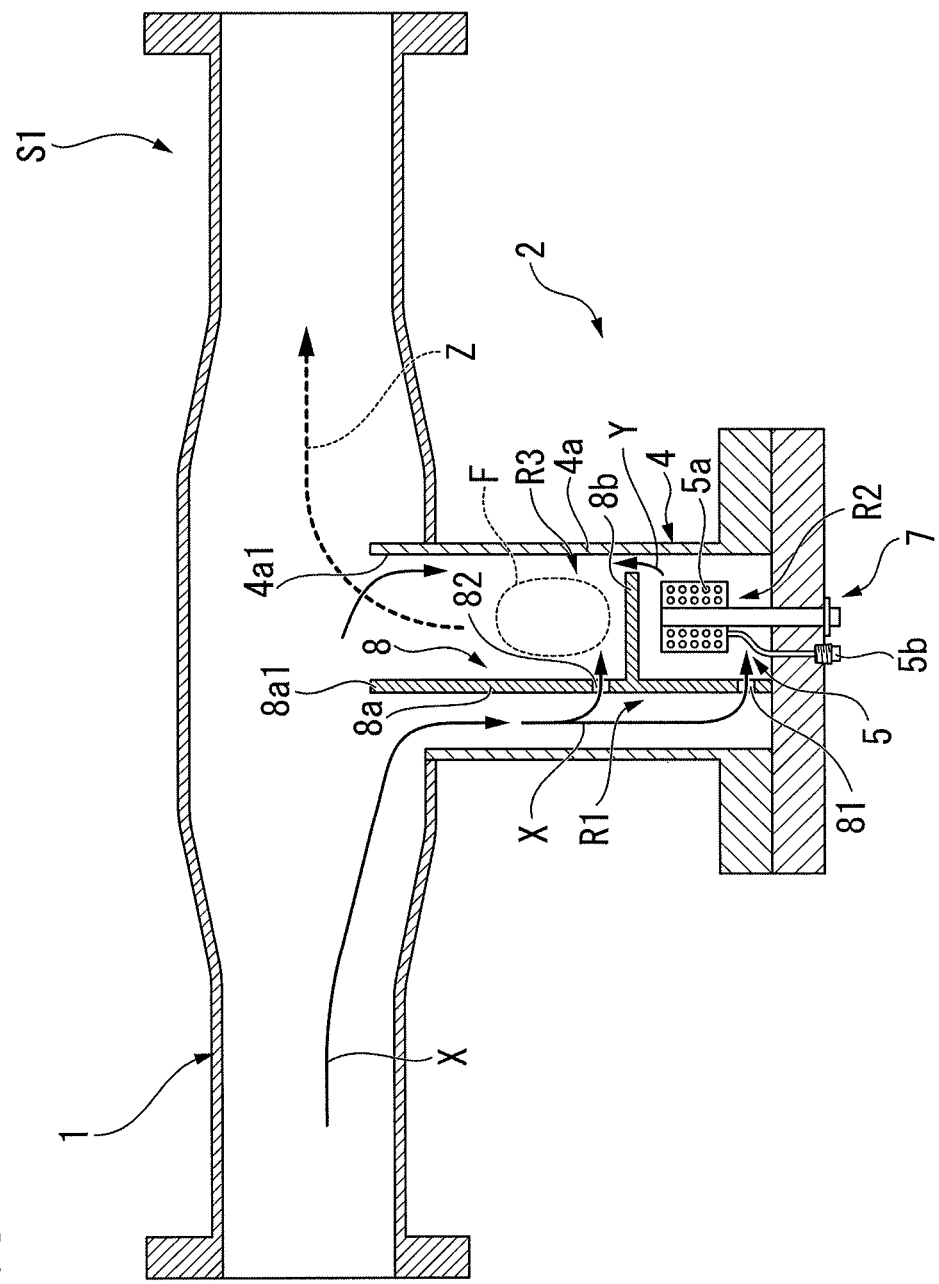
FIG. 3 is a cross-sectional view showing a modification of the burner device according to the first embodiment of the present invention.

The present embodiment adopts a structure that includes the supporting air supply device 9. However, if the concentration of oxygen contained in the exhaust gas X is high enough, it is possible to omit the supporting air supply device 9 as shown in FIG. 3.

Furthermore, in the flame retaining region R3, there may be installed, for example, a combustion support material as denoted with reference character C in FIG. 1. Materials usable as the combustion support material C include a ceramic porous body that maintains the flame retaining region at high temperatures after heated to not less than an ignition temperature by the flame F, and a catalyst that, when heated, burns itself to suppress a loss of the flame F.

According to the burner device S1 with the aforementioned structure, the combustion in the flame retaining region R3 is supported by the combustion support material C, and hence, a loss of the flame F is suppressed. Therefore, it is possible to further stabilize the combustion in the flame retaining region R3.

Second Embodiment

Next is a description of a second embodiment of the present invention. In the present embodiment, the explanation of like constituent parts to those of the first embodiment will be omitted or simplified.

Figure 4A:
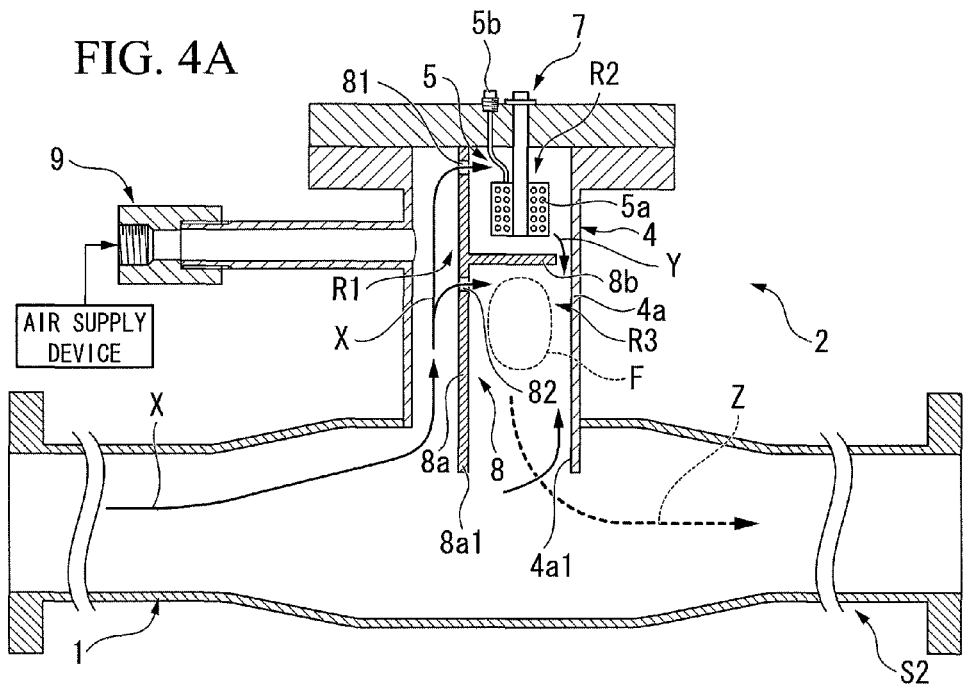
FIG. 4A is a cross-sectional view showing a schematic structure of a burner device according to a second embodiment of the present invention.

FIG. 4A is a cross-sectional view showing a schematic structure of a burner device S2 of the present embodiment. As shown in the figure, the burner device S2 of the present embodiment is arranged so that a pipe portion 4 and its internal structure are vertically symmetrical to those of the burner device S1 of the first embodiment.

Namely, in the burner device S2 of the present embodiment, the pipe portion 4, its internal structure (a partition member 8, a fuel supply portion 5, and an ignition device 7), and a connection structure (a supporting air supply device 9) are attached to an upper portion of the supply passage 1.

Also with the burner device S2 of the present embodiment that adopts this structure, it is possible to stabilize the combustion state of the mixture gas Y and, moreover, to stably produce the high-temperature gas Z, similarly to the burner device S1 of the first embodiment.

Figure 4B:
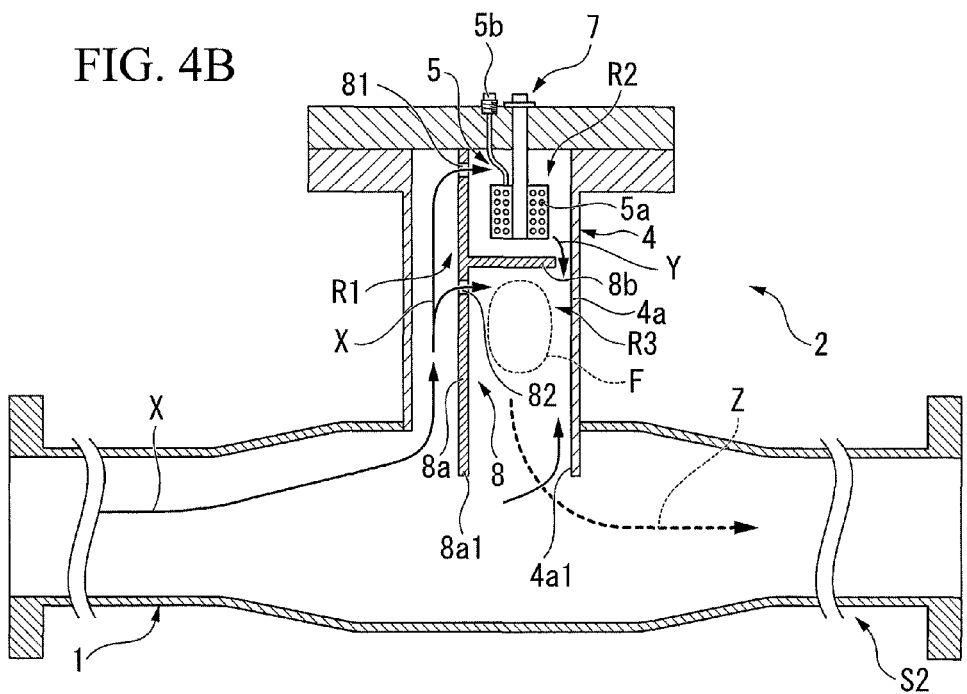
FIG. 4B is a cross-sectional view showing a modification of the burner device according to the second embodiment of the present invention.

Similarly to the first embodiment, also in the burner device S2 of the present embodiment, the supporting air supply device 9 may be omitted as shown in FIG. 4B if the concentration of oxygen contained in the exhaust gas X is high enough.

While exemplary embodiments of the invention have been described above with reference to the drawings, the above embodiments are not to be considered as limitative of the invention. Shapes, combinations and the like of the constituent members illustrated in the above embodiments are merely examples, and various modifications based on design requirements and the like can be made without departing from the scope of the invention.

For example, in the above embodiments, the description has been for the case where the end portion 4a1 of the wall portion 4a of the pipe portion 4 protrudes into the supply passage 1.

However, the present invention is not limited to this. It is possible to adopt a structure in which the end portion 4a1 of the wall portion 4a of the pipe portion 4 does not protrude into the supply passage 1.

Figure 5A:
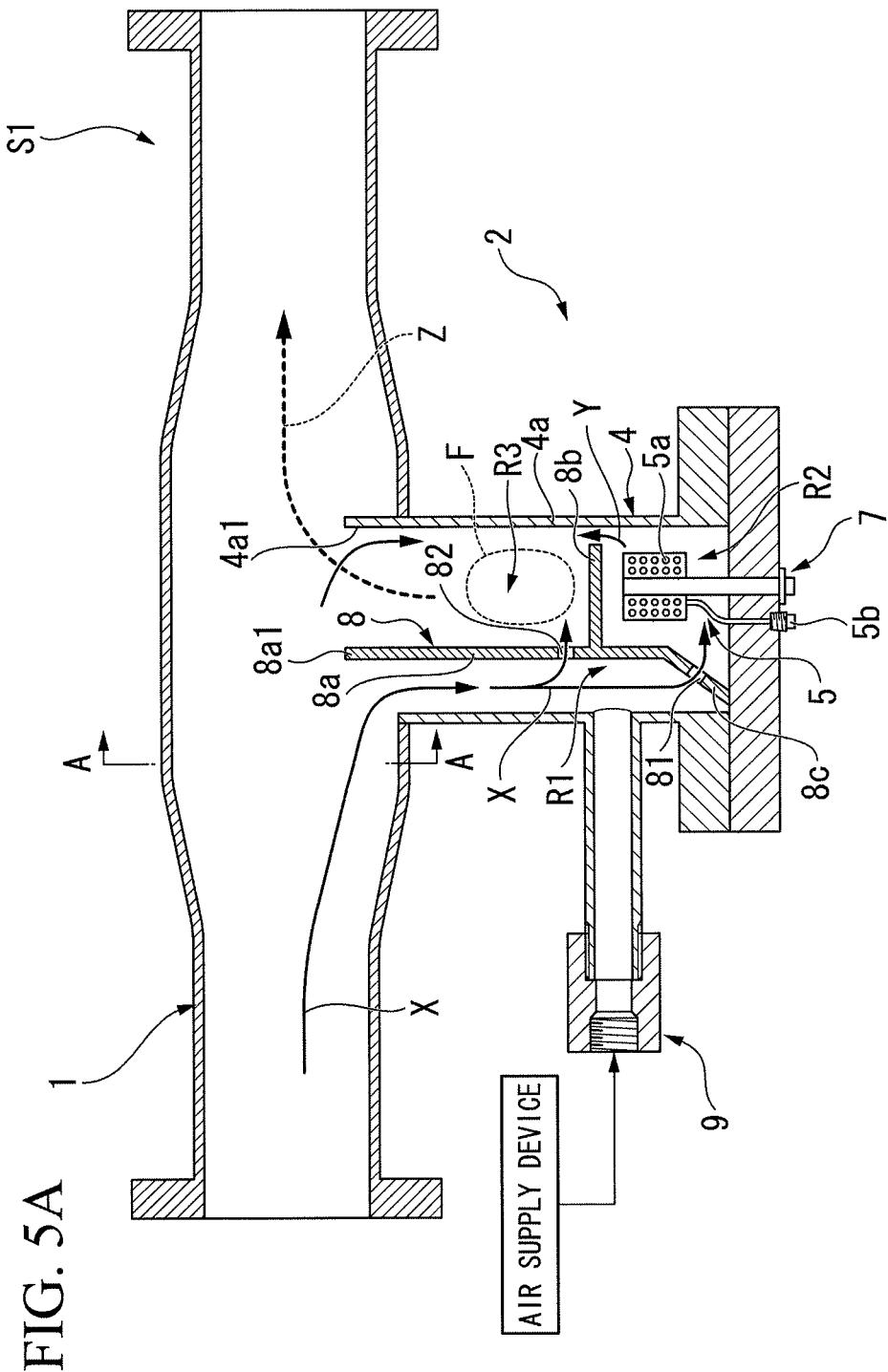
FIG. 5A is a cross-sectional view showing a modification of a center plate in a burner device of the present invention.

Furthermore, as shown in FIG. 5A, the lower end portion of the center plate 8a of the partition member 8 may be an inclined surface 8c that is spaced further away from the ignition device 7 as it is closer to the bottom surface of the pipe portion 4 (the lower side in the figure). In this case, the exhaust gas X that flows from the exhaust gas passage region R1 into the ignition region R2 via the through-hole 81 hits the bottom surface of the pipe portion 4, and is then diffused in the ignition region R2. Therefore, the flow speed of the fluid in the ignition region R2 is decreased. As a result, it is possible to ignite the mixture gas Y in the ignition region R2 with ease.

Figure 5B:
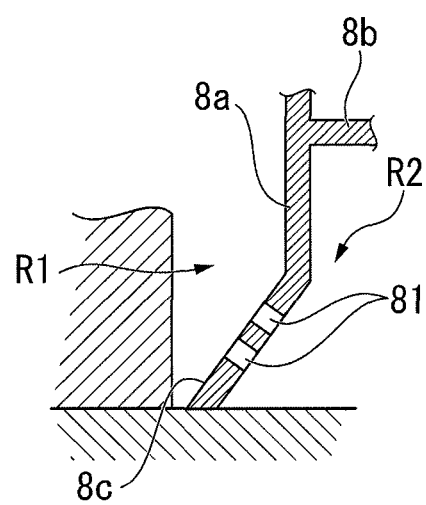
FIG. 5B is an enlarged cross-sectional view showing a modification of a through-hole of the burner device shown in FIG. 5A.

Furthermore, for example, the through-hole 81 may be formed of a plurality of holes made in the inclined surface 8c, as shown in FIG. 5B. In this case, the exhaust gas X from the exhaust gas passage region R1 is dispersed into the plurality of through-holes 81 and flows into the ignition region R2. Therefore, the flow speed of the exhaust gas X spouting from each through-hole 81 is decreased. As a result, the flow speed of the fluid in the ignition region R2 is further decreased.

In addition, in the above embodiments, the description has been for the structure in which the fuel supply portion 5b connected to the fuel retaining portion 5a is used.

However, the present invention is not limited to this. A fuel supply portion that sprays the fuel on the fuel retaining portion 5a or into the pipe portion 4 may be used.

Figure 6:
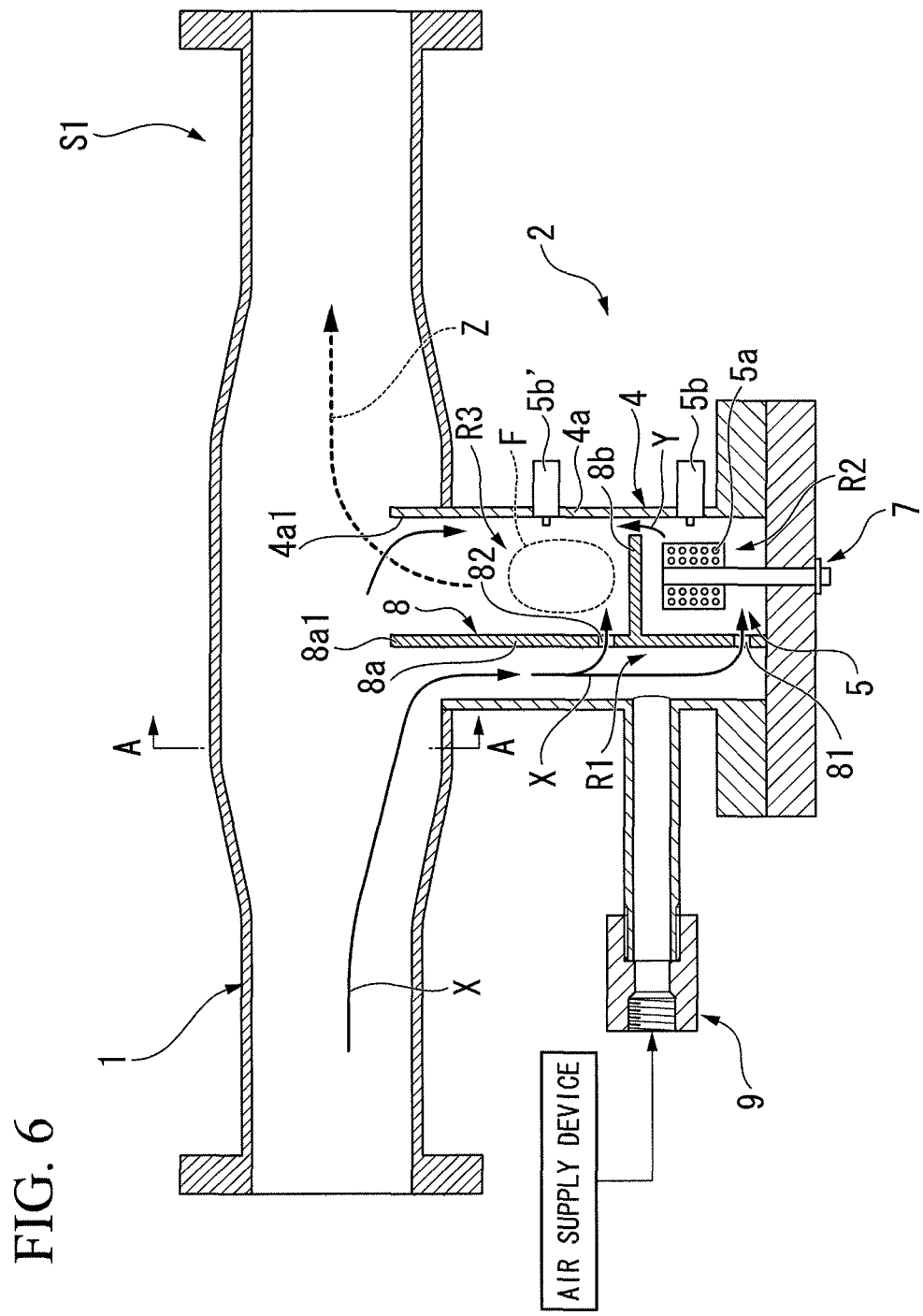
FIG. 6 is a cross-sectional view showing a modification of a fuel supply portion in the burner device of the present invention.

For example, the fuel supply portion 5b may be installed not in the bottom surface of the pipe portion 4 but in the wall portion 4a of the pipe portion 4 so as to be directed toward the ignition region R2, as shown in FIG. 6. In this case, the fuel, which has been injected from the fuel supply portion 5b into the ignition region R2, is supplied to the ignition device 7.

Furthermore, in addition to the fuel supply portion 5b, a second fuel supply portion 5b' that supplies a fuel to the flame retaining region R3 may be provided in the wall portion 4a of the pipe portion 4 so as to be directed to the flame retaining region R3, as shown in FIG. 6.

With the provision of the second fuel supply portion 5b', it is possible to finely adjust the distribution between the fuel supplied to the ignition region R2 and the fuel supplied to the flame retaining region R3. Therefore, more stable combustion can be expected.

INDUSTRIAL APPLICABILITY

According to the present invention, there is provided a burner device that makes it possible to stabilize a combustion state of a mixture gas and, moreover, to stably produce a high-temperature gas.

DESCRIPTION OF THE REFERENCE SYMBOLS

S1, S2: burner device, 1: supply passage (oxidant flow passage), 4: pipe portion, 4a: wall portion, 4a1: end portion (wall end portion, oxidant take-in device), 8: partition member, 8a1: end portion (protrusion portion), R1: exhaust gas passage region (take-in passage region), R2: ignition region, R3: flame retaining region, X: exhaust gas (oxidant), Y: mixture gas, Z: high-temperature gas

The invention claimed is:

1. A burner device that burns a mixture gas of an oxidant and a fuel, comprising:
an oxidant flow passage through which the oxidant flows: a pipe portion that has a hollow interior portion connected to the oxidant flow passage; and a partition member that air-permeably partitions the interior portion of the pipe portion into a take-in passage region of the oxidant, an ignition region that ignites the mixture gas, and a flame retaining region that maintains combustion of the mixture gas, wherein the partition member comprises a center plate having a protrusion portion that protrudes into the oxidant flow passage, and that stops a part of the oxidant flowing through the oxidant flow passage to guide into the take-in passage region, and a side plate that extends from the center plate and partitions the ignition region and the flame retaining region, and wherein a through-hole is formed at a central portion of the center plate, and a part of the oxidant taken into the take-in passage region is supplied directly to the flame retaining region through the through-hole.

2. The burner device according to claim 1, wherein the flame retaining region is arranged on a downstream side of the protrusion portion.

3. The burner device according to claim 1, wherein an area of the protrusion portion that is exposed in the oxidant flow passage is 0.14 to 0.29S where S is a cross-sectional area of the oxidant flow passage.

4. The burner device according to claim 2, wherein an area of the protrusion portion that is exposed in the oxidant flow passage is 0.14 to 0.29S where S is a cross-sectional area of the oxidant flow passage.

5. The burner device according to claim 1, wherein the center plate extends along an axial direction of the pipe portion and the side plate extends toward a side surface of the pipe portion.

6. The burner device according to claim 1, wherein a combustion support material is installed in the flame retaining region.

7. The burner device according to claim 1, wherein the mixture gas is ventilated from the ignition region to the flame retaining region through a gap between the side plate and a side surface of the pipe portion.

8. The burner device according to claim 1, wherein an ignition device is installed in the ignition region, at least a part of the ignition device is surrounded by a fuel retaining portion, and an area of the side plate is set to be larger than that of the fuel retaining portion when seen from above.

* * * * *